United States Patent
Bos et al.

(10) Patent No.: US 9,710,665 B2
(45) Date of Patent: Jul. 18, 2017

(54) SELECTIVELY ALLOWING REFERENCE TO OBJECT ON UNLOCK DISPLAY SCREEN

(71) Applicant: BlackBerry Limited, Waterloo (CA)

(72) Inventors: Jeffrey Charles Bos, Waterloo (CA); Margaret Elizabeth Kuo, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 282 days.

(21) Appl. No.: 13/946,080

(22) Filed: Jul. 19, 2013

(65) Prior Publication Data

US 2015/0026819 A1 Jan. 22, 2015

(51) Int. Cl.
  *G06F 21/53* (2013.01)
  *G06F 21/62* (2013.01)

(52) U.S. Cl.
  CPC .......... *G06F 21/6218* (2013.01); *G06F 21/53* (2013.01)

(58) Field of Classification Search
  CPC ..... G06F 21/6218; G06F 3/0488; G06F 21/53
  USPC .............. 726/27; 455/418; 345/530
  See application file for complete search history.

(56) References Cited

U.S. PATENT DOCUMENTS

| | | | |
|---|---|---|---|
| 2010/0024016 A1* | 1/2010 | Violleau | G06F 21/335 726/7 |
| 2010/0024028 A1* | 1/2010 | Baugher | G06F 21/62 726/17 |
| 2012/0154413 A1* | 6/2012 | Kim et al. | 345/530 |
| 2014/0201681 A1* | 7/2014 | Mahaffey et al. | 715/846 |

FOREIGN PATENT DOCUMENTS

| | | |
|---|---|---|
| EP | 2362292 | 8/2011 |
| EP | 2584753 | 4/2013 |

OTHER PUBLICATIONS

EPO, Extended European Search Report relating to Application No. 14177606.2, dated Oct. 8, 2014.
Obaiza, O., "How to Pin Reminders to Your iPhone's Lock Screen (So You Stop Forgetting Things)", Smartphones, http://smartphones.wonderhowto.com/how-to/pin-reminders-your-iphones-lock-screen-so-you-stop-forgetting-things-0141397/, pp. 1-4, Jan. 28, 2013.
Bouchard, A., "'Reminders+' Lets You Display Reminders on Your Lock Screen", modmyi.com, http://modmyi.com/content/9759-reminders-lets-you-display-reminders-your-lock-screen.html, pp. 1-5, Jan. 16, 2013.

* cited by examiner

*Primary Examiner* — Izunna Okeke
*Assistant Examiner* — Angela Holmes
(74) *Attorney, Agent, or Firm* — Rowand LLP (57) ABSTRACT

Methods and devices for selectively allowing a reference to an object to be included on an unlock display screen are described. In one embodiment, a processor-implemented method is described. The method includes: providing a plurality of perimeters on the electronic device, the perimeters including a low-security perimeter and a high-security perimeter; associating one or more objects with the low-security perimeter and one or more objects with the high-security perimeter; and based on the associations between the one or more objects and the one or more perimeters, selectively allowing one or more of the objects to be referenced on an unlock display screen.

17 Claims, 6 Drawing Sheets

SELECTIVELY ALLOWING REFERENCE TO OBJECT ON UNLOCK DISPLAY SCREEN

TECHNICAL FIELD

The present application relates to electronic device security and, more particularly, to methods and systems for selectively allowing a reference to an object on an unlock display screen.

BACKGROUND

Users sometimes carry more than one electronic device so that they may use different electronic devices for different aspects of their lives. For example, they may carry both a personal electronic device for personal use and may carry a work-issued electronic device for work-related use. Carrying multiple electronic devices which have overlapping capabilities is inefficient. Thus, users may wish to be able to use a single electronic device for both personal and work purposes.

Employers may also benefit when employees are permitted to use a single electronic device for both personal and work purposes. For example, when employees connect their personal electronic device to work-related systems, the personal electronic device may then be used for work purposes, allowing the employer to benefit from increased productivity associated with the use of the electronic device without having to finance the purchase of the electronic device. Thus, shared electronic devices may be advantageous for both employees and employers. However, employers are often concerned about maintaining the integrity and security of work-related files when allowing electronic devices to be used for both work and personal purposes.

BRIEF DESCRIPTION OF THE DRAWINGS

Reference will now be made, by way of example, to the accompanying drawings which show example embodiments of the present application, and in which.

Like reference numerals are used in the drawings to denote like elements and features.

DETAILED DESCRIPTION

In one example embodiment, a processor-implemented method is described. The method includes: providing a plurality of perimeters on the electronic device, the perimeters including a low-security perimeter and a high-security perimeter; associating one or more objects with the low-security perimeter and one or more objects with the high-security perimeter; and based on the associations between the one or more objects and the one or more perimeters, selectively allowing one or more of the objects to be referenced on an unlock display screen.

In another example embodiment, an electronic device is described. The electronic device includes a memory and a display. The electronic device also includes a processor coupled with the memory and the display. The processor is configured to: provide a plurality of perimeters on the electronic device, the perimeters including a low-security perimeter and a high-security perimeter; associate one or more objects with the low-security perimeter and one or more objects with the high-security perimeter; and based on the associations between the one or more objects and the one or more perimeters, selectively allow one or more of the objects to be referenced on an unlock display screen.

In yet another aspect, a non-transitory computer readable storage medium is described. The storage medium includes computer readable instructions which, when executed, cause a processor: provide a plurality of perimeters on the electronic device, the perimeters including a low-security perimeter and a high-security perimeter; associate one or more objects with the low-security perimeter and one or more objects with the high-security perimeter; and based on the associations between the one or more objects and the one or more perimeters, selectively allow one or more of the objects to be referenced on an unlock display screen.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Electronic Device

Figure 1:
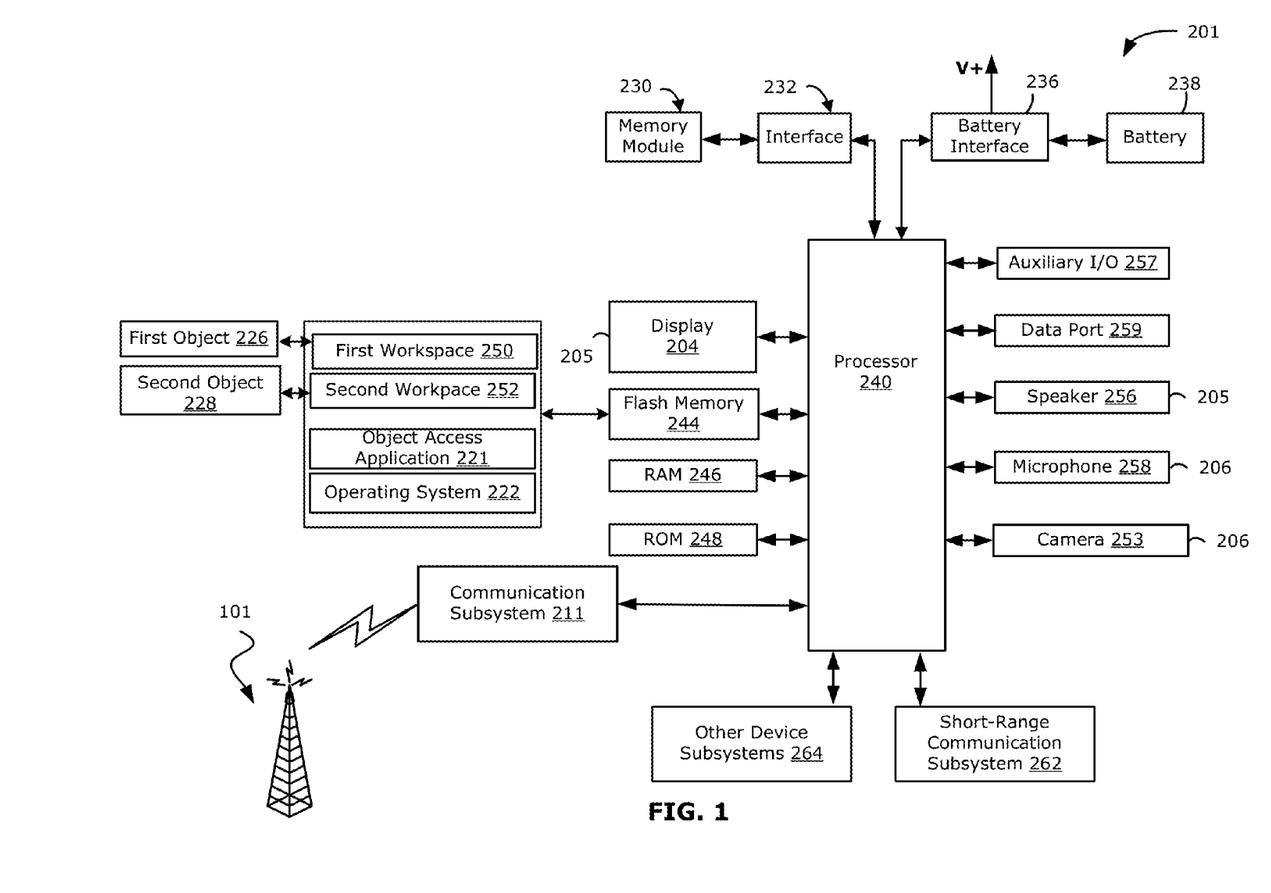
FIG. 1 is a block diagram illustrating an example electronic device in accordance with example embodiments of the present disclosure.

Reference is first made to FIG. 1 which illustrates an example electronic device 201. In the illustrated example embodiment, the electronic device 201 is a communication device, such as a mobile communication device. In at least some example embodiments, the electronic device 201 is a two-way communication device having data and voice communication capabilities, and the capability to communicate with other computer systems, for example, via the Internet. Depending on the functionality provided by the electronic device 201, in various example embodiments the electronic device 201 may be a multiple-mode communication device configured for data and voice communication, a mobile telephone such as a smart phone, a tablet computer, an electronic book reader, a wearable computer such as a watch, a PDA (personal digital assistant), or a computer system.

A smartphone is a mobile phone which offers more advanced computing capabilities than a basic non-smartphone cellular phone. For example, a smartphone may have an ability to run third party applications which are stored on the smartphone.

A tablet computer (which may also be referred to as a tablet) is an electronic device 201 which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7") or more.

In at least some example embodiments, the electronic device 201 is a handheld electronic device. A handheld electronic device is an electronic device 201 which is sufficiently small to be held in one or more hands of a user. The term handheld electronic device includes smartphones and may also include tablet computers. In at least some example embodiments, the handheld electronic device may be sufficiently small to be held in a single hand of a user. For example, the handheld electronic device may be a palm-sized device which is sized to be held in the palm of a user's hand. From the description which follows, it will be appreciated that the techniques and methods described herein may be used in electronic devices 201 having limited display capabilities.

In other example embodiments, the electronic device 201 may be of a type not specifically listed above.

The electronic device 201 includes a housing (not shown) which houses components of the electronic device 201. The internal components of the electronic device 201 are constructed on a printed circuit board (PCB). The electronic device 201 includes a controller including at least one processor 240 (such as a microprocessor) which controls the overall operation of the electronic device 201. The processor 240 interacts with device subsystems, such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, a camera 253, one or more microphones 258, and/or a touch-sensitive overlay associated with a touchscreen display, etc.), flash memory 244, random access memory (RAM) 246, read only memory (ROM) 248, auxiliary input/output (I/O) subsystems 257, a data port 259 (which may be a serial data port, such as a Universal Serial Bus (USB) data port), one or more output interfaces 205 (such as a display 204, one or more speakers 256, or other output interfaces), a short-range communication subsystem 262, and other device subsystems generally designated as 264. Some of the subsystems shown in FIG. 1 perform communication-related functions, whereas other subsystems may provide "resident" or on-device functions.

One or more of the input interfaces 206 may be configured for receiving user input to allow a user to interact with the electronic device 201. Such input interfaces 206 may, for example, allow a user to interact with a graphical user interface provided on the electronic device 201, such as the display screens described below with reference to FIGS. 2 to 4. Instructions, commands, or other forms of input may be received by the electronic device 201 via the input interfaces. For example, the input interfaces 206 may allow a user to interact with one or more selectable options (such as a button, icon, hyperlink, etc.) displayed on a graphical user interface of the display 204 (such as the display screens of any one or more of FIGS. 2 to 4). Such selectable options may also be referred to as interface elements.

The input interfaces 206 may take a variety of forms. For example, any one or combination of the following input interfaces 206 may be included on the electronic device 201 and used for receiving user input: a touchscreen display, a control button, a trackball, a track pad, an optical input device, a keyboard, a camera 253 (which may be used, for example, to detect gesture-based input), an orientation or acceleration sensor such as an accelerometer (which may be used, for example, to detect gesture-based input performed by moving the electronic device 201), and/or a microphone 258 (which may be used, for example, to detect voice-based commands). It will be appreciated that the foregoing list of input interfaces 206 is not exhaustive and that other input interfaces 206 may be used instead of or in addition to any of the interfaces 206 described above.

As noted previously, the electronic device 201 may include a touch-sensitive display 204 which may be referred to as a touchscreen or a touchscreen display 204. The touchscreen display 204 may be constructed using a touch-sensitive input surface connected to an electronic controller. The touch-sensitive input surface overlays the touchscreen display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display 204 acts as both an input interface 206 and an output interface 205. In at least some operating modes of the electronic device 201, the touchscreen display may provide a virtual keyboard.

In some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed.

In some example embodiments, the auxiliary input/output (I/O) subsystems 257 may include an external communication link or interface, for example, an Ethernet connection. The electronic device 201 may include other wireless communication interfaces for communicating with other types of wireless networks, for example, a wireless network such as an orthogonal frequency division multiplexed (OFDM) network.

In the example embodiment illustrated, the electronic device 201 also includes a memory module 230 (which may be flash memory) and a memory module interface 232. The memory module 230 may be removable from the electronic device 201. Network access may be associated with a subscriber or user of the electronic device 201 via the memory module 230, which may be a Subscriber Identity Module (SIM) card for use in a GSM network or other type of memory module for use in the relevant wireless network. The memory module 230 may be inserted in or connected to the memory module interface 232 of the electronic device 201.

The electronic device 201 may store data in an erasable persistent memory, which in one example embodiment is the flash memory 244. In various example embodiments, the data may include service data having information required by the electronic device 201 to establish and maintain communication with the wireless network 101.

The data port 259 may be used for synchronization with a user's host computer system (not shown). The data port 259 enables a user to set preferences through an external device or software application and extends the capabilities of the electronic device 201 by providing for information or software downloads to the electronic device 201 other than through the wireless network 101. The alternate download path may, for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 includes or is connectable to a power source. In the example embodiment illustrated, the power source is a battery 238, such as a rechargeable battery that may be charged, for example, through charging circuitry coupled to a battery interface 236 such as the serial data port 259. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A pre-determined set of applications that controls basic device operations, including data and possibly voice communication applications, may be installed on the electronic device 201 during or after manufacture. Additional applications and/or upgrades to an operating system 222 or software applications may also be loaded onto the electronic device 201 through the wireless network 101, the auxiliary I/O subsystem 257, the data port 259, the short-range communication subsystem 262, or other suitable device subsystems 264. The downloaded programs or code modules may be permanently installed, for example, written into the program memory (i.e. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or a web page download will be processed by the communication subsystem 211 and input to the processor 240 for further processing. For example, a downloaded web page may be further processed by a browser application or an email message may be processed by the email messaging application and output to the touchscreen display 204. A user of the electronic device 201 may also compose data items, such as email messages, for example, using the input interfaces 206, such as the touchscreen display 204. These composed items may be transmitted through the communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces). Alternative voice or audio I/O subsystems, such as a voice message recording subsystem, may also be implemented on the electronic device 201. Although voice or audio signal output is typically accomplished primarily through the speaker 256, the touchscreen display 204 may also be used to provide an indication of the identity of a calling party, duration of a voice call, or other voice call related information.

The processor 240 operates under stored program control and executes software modules stored in memory such as persistent memory, for example, in the flash memory 244. As illustrated in FIG. 1, the software modules include an operating system 222 and other software applications, such as an object access application 221 which will be described in greater detail below.

The operating system 222 may control the overall operating of the electronic device 201. In at least some embodiments, the operating system 222 may implement sandboxing on the electronic device 201. That is, a sandboxing technique may be used which allows for the separation of data and/or applications into two or more separate operating environments, referred to herein as perimeters.

In the electronic device 201 of FIG. 1, at least some files and applications that access the files can be classified as being associated with a particular perimeter 250, 252. A perimeter (also referred to herein as a sandbox) can be defined as a perimeter or environment, in which access to the files and/or applications is restricted.

Each perimeter 250, 252 may, in at least some embodiments, be associated with a separate partition. Each perimeter is separate from each of the other perimeters such that a tightly-controlled set of resources for controlling entities such as, but not limited to, data files, network connections and hardware and running applications that access the entities provides a security mechanism for separating the launching and running of programs and entities in the different perimeters. Rule sets can be implemented to provide full control over what processes are started, spawned (by other applications), allowed to access entities such as, but not limited to, data files, network connections, and hardware, or allowed to inject code into other applications. Sandboxing (i.e. the establishment of the various perimeters 250, 252) provides a security system where data is prevented from movement between the different areas. More specifically, perimeters 250, 252 (and other components, and software on the electronic device 201) may be configured such that data is prevented from being moved between different perimeters 250, 252. For example, an application running within one perimeter may not access data associated with the other perimeter(s).

The perimeters 250, 252 generally allow the electronic device 201 to be used in different operational contexts while maintaining file security. For example, the electronic device 201 may be used for both personal use and also for business use in some example embodiments. Business files and applications be kept separately from personal files and application (e.g. business files may be kept in a corporate sandbox/perimeter and personal files may be kept in a personal sandbox/perimeter and the sandboxes/perimeters may be walled off from one another so that file transfers between the sandboxes/perimeters are prevented or controlled). Thus, the perimeters 250, 252 may be considered to be secure and lockable file systems, in at least some example embodiments.

Accordingly, in at least some example embodiments, there can be multiple modes or perimeters provided by the electronic device 201. An application running in one perimeter 250, 252 can access entities such as, but not limited to, data files, network connections, and hardware in the perimeter 250, 252 in which it is running, but can be restricted from accessing and operating on entities such as, but not limited to, data files, network connections, and hardware in another perimeter.

For example, the system may be partitioned into two perimeters—a low security perimeter (such as a personal perimeter) and a high-security perimeter (such as a corporate perimeter). The data and files in the high-security (e.g. corporate) perimeter can be strictly separated from applications or programs running in the low-security (e.g. personal) perimeter. This secure separation provides a security mechanism that allows a system to operate in the numerous modes. The establishment of a secure separation to provide a security mechanism that allows a system to operate in numerous modes is not limited to two perimeters and can be implemented for three or more perimeters.

In FIG. 1, the memory is illustrated as being partitioned into a plurality of perimeters 250, 252. In the example embodiment illustrated, the memory is partitioned into a first perimeter 250 and a second perimeter 252. Each perimeter 250, 252 may be associated with separate data and/or applications and the operating system 222 may prevent data associated with one of the perimeters 250 from being moved into the other of the perimeters 252. The partitioning of memory into a plurality of perimeters may be a logical and/or physical partition. For example, in some embodiments, different partitions may be stored in separate memories or in separate areas of a single memory. In some embodiments, elements of each perimeter may not be physically partition but may, for example, be logically partitioned within one or more memories so that it may be determined with which perimeter each element is associated perimeter.

The data associated with a perimeter may include one or more data objects 226, 228. In the example illustrated, the first perimeter 250 is associated with a first object 226 (which may also be referred to as a first data object) and the second perimeter 252 is associated with a second object 228 (which may also be referred to as a second data object). It will be appreciated that while each perimeter 250, 252 is illustrated as being associated with a single object in the example of FIG. 1, in practice, the perimeters 250, 252 may each be associated with a plurality of objects.

The data objects 226, 228 may be of various types. For example, in some embodiments, the data objects 226, 228 may include action items (i.e. tasks), memos (which may also be referred to as notes), email messages, calendar entries, and/or contact records. In at least some embodiments, the data objects 226, 228 may include personal information management (PIM) objects. That is, the data objects 226, 228 may be PIM records associated with a personal information manager. The data objects 250, 252 may include other types of data objects in other embodiments.

An action item (which may also be referred to as a task) is a record of an action that a user wishes to perform. That is, the action item represents something that the user intends to act upon and to complete. An action item may represent a concrete, defined action. For example, action item may be a reminder to review, e-mail or follow up on something. Accordingly, an action item may be a record of an action that a user wishes to be reminded of. That is, the action item may be a record of a future action (i.e. an action that a user intends to perform in the future) and may serve as a record for a user to remind the user that an action is required. In at least some embodiments, an action item may be associated with a date and/or time and a reminder may be configured to trigger at the associated date and/or time.

In contrast, a memo (which may also be referred to as a note) is not a record of an action that is to be completed. The memo may, for example, be a reference, such as a reference document. No specific action may be planned for the memo and/or the memo may not have any completion date associated therewith. The memo is stored so that a user may access the memo at an unspecified later date or time.

Accordingly, each of the perimeterperimeters 250, 252 may be associated with one or more objects (such as a first object 226 associated with the first perimeter 250 and a second object 228 associated with the second perimeter 252) which may include, for example, action items, memos, text, images, videos, links, etc.

In at least some example embodiments, one or more highly trusted applications may act as hybrid applications. A hybrid application is a trusted application that is capable of and permitted to concurrently access files from more than one perimeter 250, 252. That is, the hybrid application is permitted to access data from a plurality of perimeters 250, 252 within a single instance of the hybrid application. The ability to access files from a plurality of perimeters 250, 252 at the same time may be provided to the hybrid application by higher-level system components, such as a perimeter management application or module (not shown) which manages the perimeters 250, 252 and administers a set of access rules for the sandboxes. The perimeter management application or module may, for example, be provided by the operating system 222.

In at least some example embodiments, one or more of the perimeters 250, 252 may be lockable (e.g. the first perimeter 250 may be a work/corporate sandbox which is lockable). That is, one or more of the perimeters may be locked so that applications and data associated with that perimeter are not accessible until the perimeter is unlocked. Such locking may provide an additional level of security to the electronic device 201. For example, an electronic device 201 having corporate data stored within a corporate perimeter may be used by someone who is not authorized to view or access the corporate data. More particularly, the corporate perimeter could be locked and the unauthorized person may be permitted to utilize the electronic device 201 while only a personal perimeter is unlocked and available.

In at least some embodiments, the memory is configured with one or more object access application 221 which is configured for accessing one or more of the objects 226, 228. The object access application 221 is configured for accessing data objects of specific types. In some embodiments, the object access application 221 is a personal information management (PIM) application which is configured for accessing objects that are PIM records.

The objects that are accessed by the object access application 221 may be any of the objects discussed above or combinations thereof. For example, in some embodiments, the object access application 221 may provide access to data objects that are action items and/or data objects that are memos. In this way, in at least some embodiments, the object access application 221 may act as a remembrance facilitating application by providing access to data objects that may remind the user of something. For example, action items may be used to remind the user of something that needs completing and/or that has a defined period of time during which it must be completed and memos be used to remind the user of something that has been completed and/or something that the user wishes to complete but which does not have a defined period of time during which it must be completed.

The object access application 221 may be configured to manage associated data objects and may, in various embodiments, allow such data objects to be opened, displayed, modified and/or deleted. In at least some embodiments, the object access application 221 may allow new data objects to be created. The object access application 221 may provide for other functions in other embodiments. As will be described in greater detail below, in at least some embodiments, the object access application 221 may permit a data object to be pinned to an unlock display screen. That is, a reference to a data object may be added by the object access application 221 to the unlock display screen.

In some embodiments, each perimeter 250, 252 may be associated with a separate object access application 221, which may provide for the management of associated data objects contained in the respective perimeter 250, 252. For example, in some embodiments, the first perimeter 250 may be associated with a first object access application which may be used to manage data objects (such as the first object 226) associated with the first perimeter 250 and the second perimeter 252 may be associated with a second object access application which may be used to manage data objects (such as the second object 228) associated with the second perimeter 252.

In the example illustrated, the object access application 221 is a hybrid application. That is, the object access application 221 is a trusted application which is permitted to access data objects in both the first perimeter 250 and the second perimeter 252. For example, in some embodiments, the object access application 221 may provide a display screen 300, 400 (FIGS. 3 and 4) in which data objects associated with the first perimeter 250 and data objects associated with the second perimeter 252 are displayed together (e.g. in a single list).

In at least some embodiments, the electronic device 201 may be placed into a sleep mode and/or a locked mode in which a number of functions of the electronic device 201 are not available until the electronic device is woken up and/or unlocked. For example, in at least some embodiments, the operating system 222 may be configured to detect a lock condition and to, in response, lock the electronic device 201 to disable a plurality of features until the electronic device 201 is subsequently unlocked. The lock condition may, for example, occur when a user instruction is received instructing the electronic device to enter the locked state and/or may occur when the electronic device has been inactive (e.g. no user input has been received) for at least a predetermined period of time.

In order to facilitate wakeup and/or unlocking of the electronic device 201, the operating system 222 may be configured to display an unlock display screen 150 (FIG. 2) while the electronic device 201 is locked and/or asleep. The unlock display screen 150 may be displayed when the electronic device 201 is locked, asleep, or both. The unlock display screen 150 may be used to either provide some basic information about the status of the electronic device (such as by providing the current time, the time of the next event, the number of messages in an inbox, etc.) and/or to assist with the unlocking of the electronic device 201.

Figure 2:
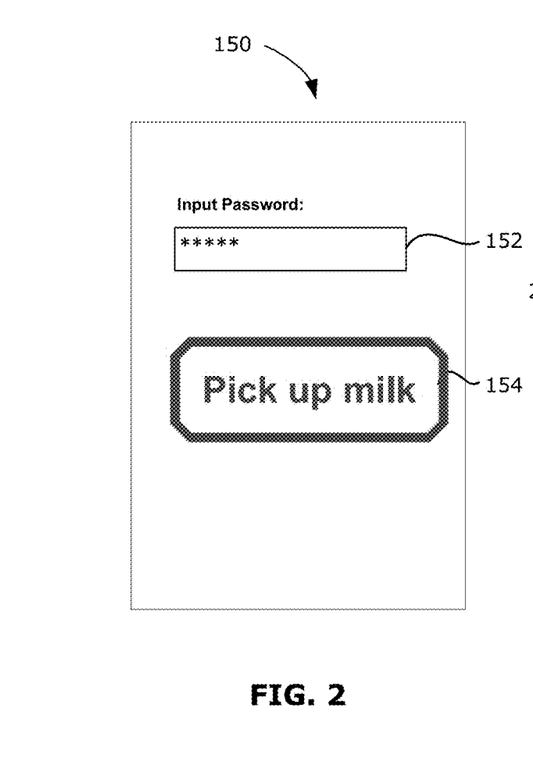
FIG. 2 illustrates an example unlock display screen in accordance with example embodiments of the present disclosure.

The unlock display screen 150 may be displayed in response to a predetermined triggering event, such as, for example, user input via an input interface 206. Thus, the unlock display screen 150 is typically displayed at a point in time at which the user's attention is focused on the electronic device 201. As will be described in greater detail below, the unlock display screen 150 may be configured to display a reference to an object. The referenced object may be an object associated with the object access application 221, such as an action item and/or a memo). Since the electronic device 201 is typically being viewed at this time, the reference to the object may be observed by the user.

The unlock display screen 150 may be displayed prior to the unlocking of the electronic device 201. That is, the unlock display screen 150 may be displayed before the electronic device 201 is unlocked via password input or another authentication process. Thus, the unlock display screen 150 may be viewed by an unauthorized user. In at least some embodiments, to prevent highly secure data objects from being viewed by an unauthorized user, the electronic device 201 may permit data objects associated with a low-security perimeter (such as a personal perimeter) to be referenced on the unlock display screen but may not permit data objects associated with a high-security perimeter (such as a corporate perimeter) to be referenced on the unlock display screen. More particularly, in at least some embodiments, the object access application 221 may be configured to allow a user to select an object associated with a low-security perimeter to be referenced on the unlock display screen 150 and may prevent a user from selecting objects associated with high-security perimeter from being referenced on the unlock display screen.

Functions and features of the object access application 221 will be discussed in greater detail below with reference to FIGS. 5 to 8.

Software modules associated with the electronic device 201 (such as software modules associated with the operating system 222 or the object access application 221) or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Example Unlock Display Screen

Referring now to FIG. 2, an example unlock display screen 150 will be discussed. The unlock display screen 150 may be displayed on the display 204 by the operating system 222 of the electronic device 201 when the electronic device 201 is in a locked and/or sleep state. In at least some embodiments, the unlock display screen 150 is displayed when a predetermined trigger is received while the electronic device is in the locked and/or sleep state. The predetermined trigger may, for example, be associated with user input received via an input interface 206. For example, the unlock display screen 150 may be displayed when a user activates the touchscreen, performs a predetermined touchscreen gesture, presses a button, or shakes the electronic device 201 (which may be detected via an orientation sensor such as an accelerometer or a gyroscope), etc. These triggers are merely examples and other triggers may be used in other embodiments.

In at least some embodiments, the unlock display screen 150 provides an interface 152 for receiving authentication information to unlock the electronic device 201. For example, in the example illustrated, the unlock display screen 150 includes a field which is configured for receiving a password.

The unlock display screen 150 includes a reference 154 to an object. The reference 154 is a visual reminder or cue regarding the object, such as an action item or a memo. In the example illustrated, the object that is referenced is a text-based reminder (such as an action item or memo) to perform a specific task (e.g. pick up milk). The reference 154 to the object may include the complete contents of the object or a portion thereof. For example, in the example illustrated, the object is "pick up milk" and the reference 154 to that object includes the full text of the object. However, in other embodiments, the reference 154 to the object may be a truncated version of the object. For example, where the object is too long, the reference 154 to that object may be truncated when it is displayed on the unlock display screen.

In at least some embodiments, the operating system 222 is configured to display an unlock display screen 150 which includes a reference 154 which may be activated. That is, the reference 154 to an object may be selectable and the selection of the object may cause an action associated with the object to be performed. For example, in some embodiments, selection of the object (e.g. by touching the object displayed on a touchscreen display) may cause the object to be displayed more fully (e.g. if the reference 154 was a truncated version of the object, then the non-truncated version of the object may be displayed).

Figure 7:
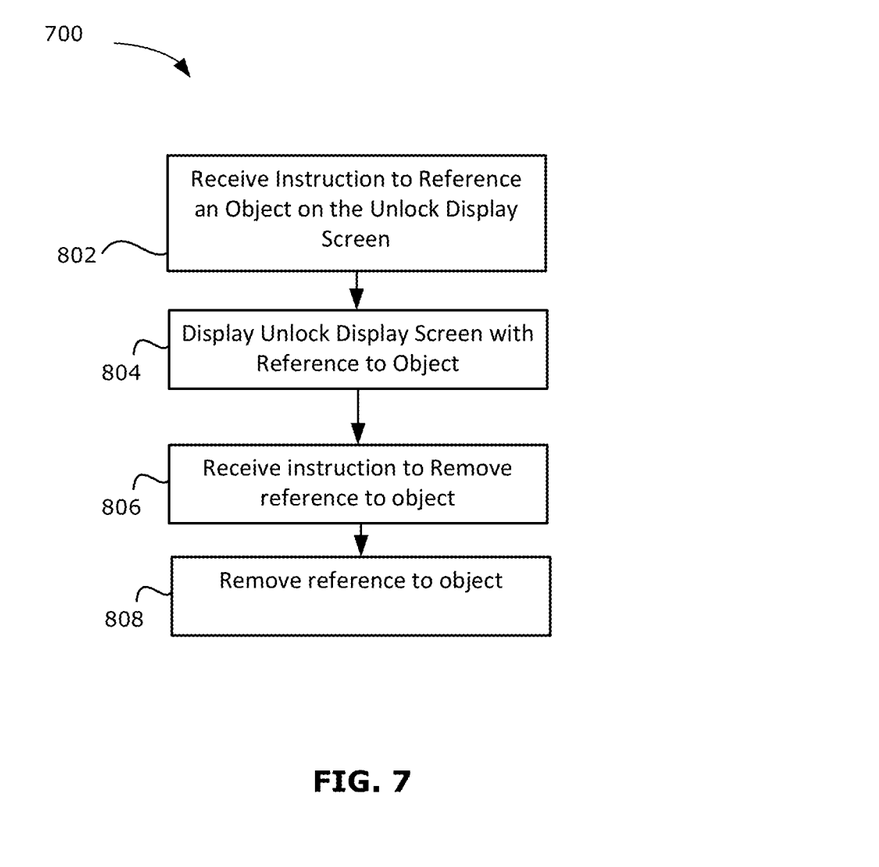
FIG. 7 is a flowchart of an example method for removing a reference to an object from an unlock display screen.

As will be described in greater detail below with reference to FIG. 7, in some embodiments, the unlock display screen may provide a mechanism for removing the reference to the object so that it no longer appears on the unlock display screen (or on subsequent displays of the unlock display screen). For example, in some embodiments, pressing and holding the reference 154 to the object may be used to remove the reference to the object.

Securely Configuring References to Objects

As noted in the discussion of FIG. 1 above, in order to provide additional security, the electronic device 201 may prevent objects associated with a high-security perimeter 250 from being referenced on the unlock display screen. Techniques of preventing objects associated with a high-security perimeter 250 from being referenced on the unlock display screen will now be described.

Figure 3:
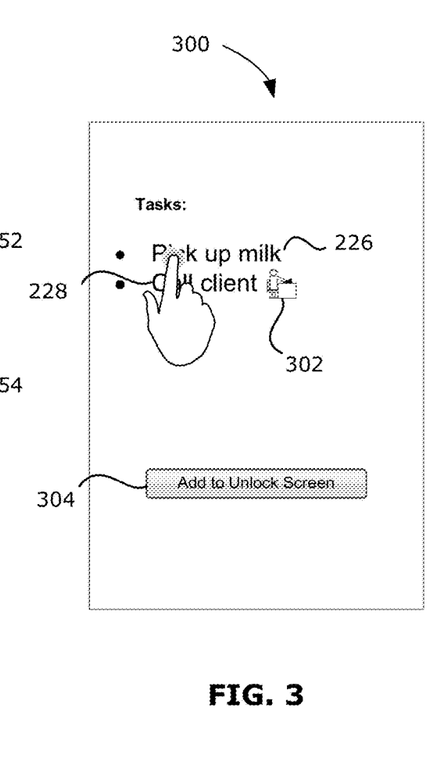
FIG. 3 is a flowchart of an example display screen containing a selectable option to add a reference to an object on the unlock display screen on FIG. 2.

Referring now to FIG. 3, an example display screen 300 is illustrated. The example display screen 300 is a graphical user interface which allows a reference to an object to be added to the unlock display screen 150 (FIG. 2). In the example illustrated, the display screen 300 may be provided by the object access application 221. As noted in the discussion of FIG. 1, in at least some embodiments, the object access application 221 may be a personal information management application.

The display screen 300 may include a list of two or more object associated with the object access application 221. In the example illustrated, the object access application 221 is a hybrid application which lists objects associated with both the first perimeter 250 and the second perimeter 252. More particularly, a first object 226 is associated with the first perimeter (which is a personal, low-security perimeter in the example) and a second object 228 is associated with the second perimeter 252 (which is a corporate, high-security perimeter in the example). In the example illustrated, the display screen 300 includes one or more identifiers 302 which identify the source of the data objects 226, 228. That is, from the display screen 300 it is possible to determine whether an object is associated with the first perimeter 250 or whether it is associated with the second perimeter 252. In the example illustrated, the identifier 302 is placed adjacent to data objects associated with the second perimeter and the data objects associated with the first perimeter 250 are not associated with an identifier 302.

In the example illustrated, at least some of the objects 226, 228 listed on the display screen 300 are selectable and the selection of an object may allow operations associated with that object to be performed. For example, in some embodiments, touching and holding an object associated with a low-security perimeter (i.e. the first perimeter 250) may cause a selectable option 304 to reference the selected object on the unlock display screen 150 (FIG. 2) to be displayed. In the example of FIG. 3, a user (illustrated by a hand) activates (e.g. touches and holds) the first object 226, which is an object associated with the first perimeter 250. In response, the selectable option 304 to reference the first object 226 on the unlock display screen 150 is displayed.

Figure 4:
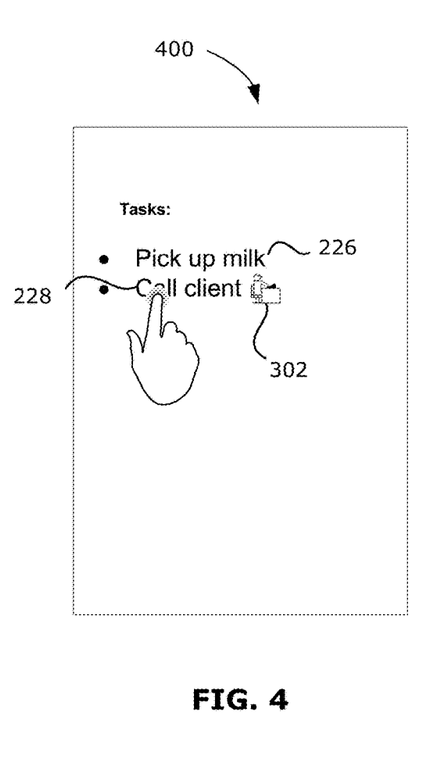
FIG. 4 is a flowchart of a further example display screen in accordance with example embodiments of the present disclosure.

In contrast, referring now to FIG. 4, another example display screen 400 is illustrated. The example display screen 400 is displayed when an object associated with a high-security perimeter 252 is activated. For example, in the example of FIG. 4, a user activates (e.g. touches and holds) the second object 228, which is an object associated with the second perimeter 252. In response, no selectable option 304 to reference the second object 226 is displayed.

Accordingly, a selectable option to reference an object associated with a first perimeter (i.e. a low-security perimeter) may be provided but a selectable option to reference an object associated with the second perimeter (i.e. a high-security perimeter) is not provided. Since the unlock display screen is configured to include the object associated with the selectable option 304 in response to activation of the selectable option 304, only objects associated with the first perimeter (i.e. the low security perimeter) will be referenced on the unlock display screen.

Methods of Selectively Allowing Reference to Objects on Unlock Display Screen

Reference will be made to FIGS. 5 to 8 which illustrate example methods 500, 506, 700, 800. Any one or more of the example methods 500, 506, 700, 800 may be performed by the electronic device 201 of FIG. 1. More particularly, the processor 240 of the electronic device 201 may be configured to perform any one or more of the methods 500, 506, 700, 800. A memory associated with the processor 240 may include processor-executable instructions which, when executed, cause the processor 240 to perform any one or more of the methods 500, 506, 700, 800. In at least some example embodiments, these processor-executable instructions are provided in one or more of the software modules described above with reference to FIG. 1. For example, the object access application 221 and/or an operating system 222 associated with the electronic device 201 may configure the electronic device 201 to perform any one or more of the methods 500, 506, 700, 800. Since a plurality of different software components may cause the methods 500, 506, 700, 800 to be performed, the methods 500, 506, 700, 800 may be comprised of a plurality of sub-methods each performed by a different software component.

For example, a portion of any one or more of the methods 500, 506, 700, 800 may be performed by the operating system 222. That is, the operating system 222 may be configured to cause the processor 240 to perform a portion of one or more of the methods 500, 506, 700, 800.

Similarly, a portion of any one or more of the methods 500, 506, 700, 800 may be performed by the object access application 221. That is, the object access application 221 may be configured to cause the processor 240 to perform a portion of any one or more of the methods 500, 506, 700, 800.

Figure 5:
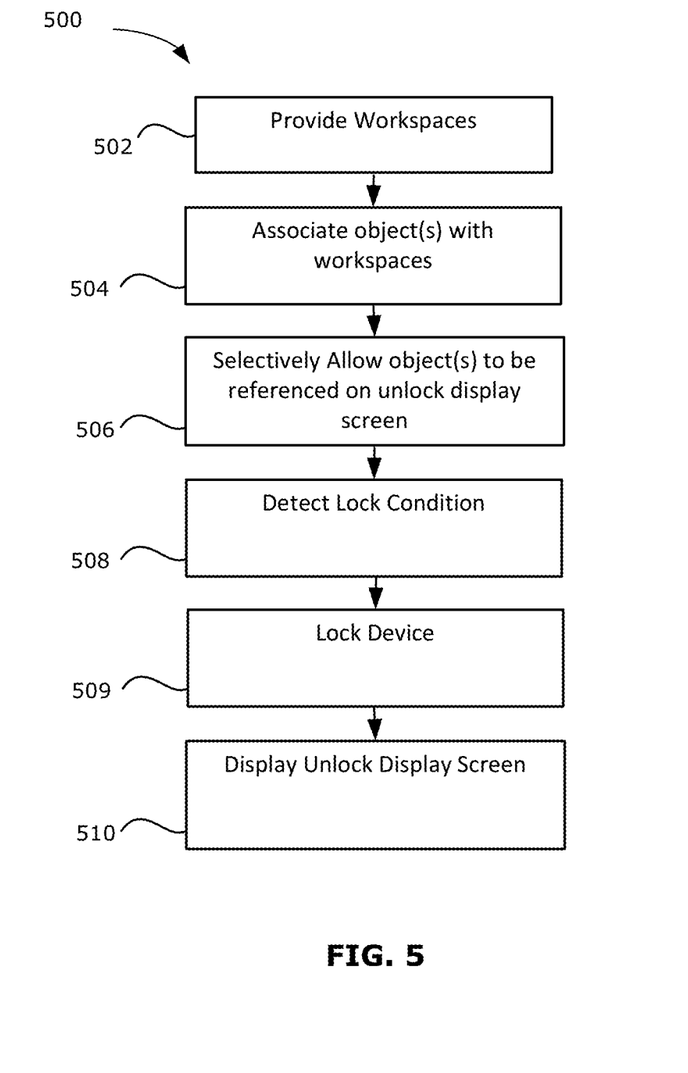
FIG. 5 is a flowchart of an example method for selectively allowing an object to be referenced on an unlock display screen.

Referring first to FIG. 5, an example method for selectively allowing an object to be referenced on an unlock display screen 150 is illustrated.

At 502, a plurality of perimeters 250, 252 are provided on the electronic device by the operating system 222. That is, the operating system 222 is configured to provide at least two perimeters 250, 252, including a first perimeter 250 (which may be referred to as a low-security perimeter or a personal perimeter) and a second perimeter 252 (which may be referred to as a high-security perimeter or a corporate perimeter). The perimeters 250, 252 are described in greater detail above with reference to FIG. 1.

At 504, objects are associated with perimeters. For example, one or more objects may be associated with the low-security perimeter (i.e. the first perimeter 250) and one or more objects may be associated with the high-security perimeter (i.e. the second perimeter 252).

As noted in the discussion of FIG. 1, each perimeter 250, 252 may have a separate partition and/or file system for storing files associated with that perimeter 250, 252. In at least some embodiments, an object may be associated with a perimeter if that object is stored in the partition and/or file system associated with that perimeter. Thus, when an object is stored in a particular perimeter 250, 252 (e.g. in the file system or partition associated with that perimeter), the object may be said to be associated with that perimeter 250, 252.

In the example embodiment of FIG. 5, the step 504 of associating objects with perimeters is illustrated using a single block. However, it will be appreciated that the association between objects and perimeters may be prolonged. That is, the association between objects and perimeters may not occur all at once; the association may occur over time as new objects are created and stored in one of the perimeters 250, 252.

In at least some embodiments, step 504 may be provided by the object access application 221. More particularly, the object access application 221 may create new objects (e.g. in response to user input) and may store them in one of the perimeters 250, 252. As noted above, in some embodiments, the objects may include action items and/or memos. Other types of objects may be included in other embodiments.

In some example embodiments, at 504 a first object 226 (FIG. 1) may be associated with the first perimeter 250 (e.g. the low-security perimeter) and a second object 228 (FIG. 1) may be associated with the second perimeter 252 (e.g. the high-security perimeter).

At 506, the object access application 221 (or another application) may selectively allow one or more of the objects to be referenced on an unlock display screen 150 (FIG. 2). More particularly, the object access application 221 may selectively allow objects to be referenced based on the associations between the objects and the perimeters. As noted in the discussion of FIGS. 2 to 4, objects which are associated with the low-security perimeter (i.e. the first perimeter 250), such as the first object 226, may be allowed to be referenced on the unlock display screen 150 while objects which are associated with the high-security perimeter (i.e. the second perimeter 252), such as the second object 228, may be prevented from being referenced on the unlock display screen 150. As noted in the discussion of FIGS. 3 and 4 above and in the discussion of FIG. 6 below, in at least some embodiments, the object access application 221 may selectively allow a first object 226 associated with a low-security perimeter to be referenced on the unlock display screen 150 by providing a selectable option 304 (FIG. 3) to reference the first object 226 on the display screen. In contrast, no selectable option to reference the second object, which is associated with the high-security perimeter, is provided.

Accordingly, in at least some embodiments, at 506 the unlock display screen is configured to include a reference 154 to an object associated with the low-security perimeter (i.e. the first perimeter 250), such as the first object 226.

In some embodiments, at 508 the operating system 222 may detect a lock condition and may, in response, lock the electronic device 201 at 509 to disable a plurality of features until the electronic device 201 is subsequently unlocked. For example, in order to prevent "pocket dialing", in some embodiments, telephony functions are disabled in the locked mode unless the electronic device 201 is either unlocked or placed into an emergency mode.

The lock condition may, for example, occur when a user instruction is received instructing the electronic device to enter the locked state and/or may occur when the electronic device has been inactive (e.g. no user input has been received) for at least a predetermined period of time. Other lock conditions may be used in other embodiments.

After the electronic device 201 is placed into the locked mode, the unlock display screen 150 may be displayed at 510. In at least some embodiments, the unlock display screen 150 is displayed when a predetermined trigger is received. The predetermined input may, for example, be user input received via an input interface 206. For example, the unlock display screen 150 may be displayed when a user activates the touchscreen, performs a predetermined touchscreen gesture, presses a predetermined button, or shakes the electronic device 201 (which may be detected via an orientation sensor such as an accelerometer or a gyroscope), etc. These triggers are merely examples and other triggers may be used in other embodiments.

The unlock display screen 150 displayed at 510 may be of the type described above with reference to FIG. 2. The unlock display screen 150 includes a reference 154 to the object which was configured to be included at 506. For example, the unlock display screen 150 may include a reference 154 to a first object 226, which is an object associated with a low-security perimeter. As noted above, in some embodiments, the first object may be an action item and, in some embodiments, the first object may be a memo. The reference 154 to the object may, in at least some embodiments, be displayed in the foreground of the unlock display screen 150.

As noted in the discussion of FIG. 2, the reference 154 to the object may be configured to be activated via user input. That is, the reference 154 to the object may be selectable and the selection of the reference to the object may cause an action associated with the object to be performed. For example, in some embodiments, selection of the object (e.g. by touching the object displayed on a touchscreen display) may cause the object to be displayed more fully (e.g. if the reference 154 was a truncated version of the object, then the non-truncated version of the object may be displayed).

Figure 6:
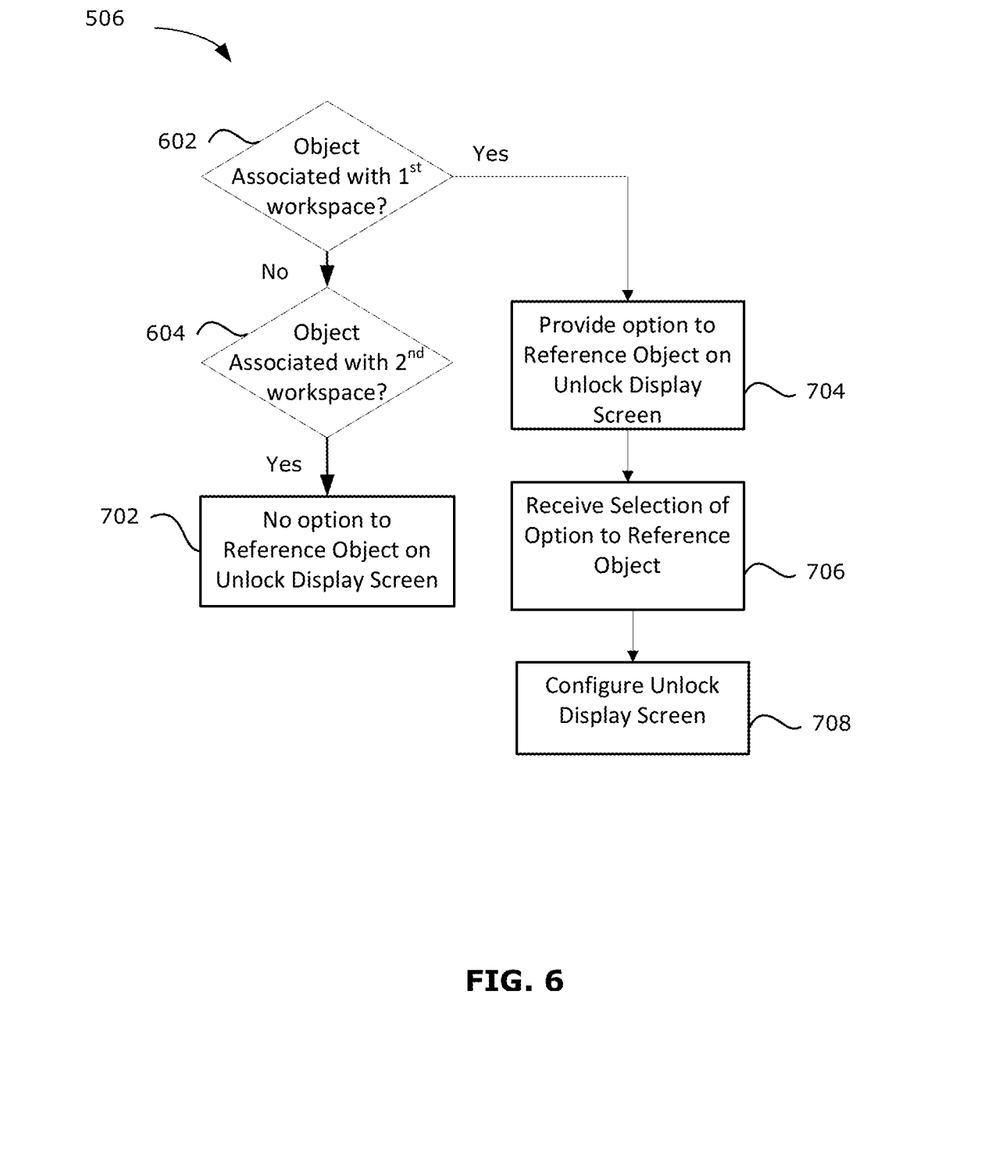
FIG. 6 is a flowchart of a further example method for selectively allowing an object to be referenced on an unlock display screen.

Reference will now be made to FIG. 6 which illustrates an example embodiment of a method 506 for selectively allowing an object to be referenced on an unlock display screen 150. The method 506 may be performed during the method 500 of FIG. 5 (i.e. the method 506 of FIG. 6 may be performed at 506 of FIG. 5). The method 506 may be performed by the object access application 221. That is, the object access application 221 may configure the processor 240 to perform the method 506.

At 602 and 604, the electronic device 201 determines whether an object is associated with the first perimeter 250, which is a low-security perimeter, or the second perimeter 252, which is a high-security perimeter. More specifically, at 602, the electronic device determines whether the object is associated with the first perimeter 252 and, at 604, the electronic device determines whether the object is associated with the second perimeter.

The determination of the perimeter associated with an object may, for example, be performed when a display screen 300, 400 of the type described above with reference to FIGS. 3 and 4 is displayed. For example, in at least some embodiments, the determination may be performed when an object displayed on the display screen 300, 400 is activated. That is, when an object (such as the first object 226 or the second object 228 of FIGS. 3 and 4) is activated, the electronic device may then determine whether that object is associated with the first perimeter (at 602) or the second perimeter (at 604).

It will be appreciated that, while FIG. 6 illustrates two determination steps, in embodiments in which there are only two perimeters, a single determination step may be used. For example, if it is determined that an object is not associated with the first perimeter, then it may be assumed that it is associated with the second perimeter.

If an object is determined to be associated with the high-security perimeter (e.g. if it is the second object 228 illustrated in FIG. 1 which is associated with the second perimeter), then the electronic device 201 may (at 702) provide no selectable option to reference that object on the unlock display screen. That is, in response to determining that the object is associated with the high-security perimeter, the electronic device 201 determines that a selectable option to reference that object on the unlock display screen will not be provided on a graphical user interface of the electronic device. For example, a display screen 400 of the type described with reference to FIG. 4 may be displayed.

If the object is determined to be associated with the low-security perimeter (e.g. if it is the first object 226 illustrated in FIG. 1 which is associated with the first perimeter) then a selectable option 304 (FIG. 3) to reference the first object on the unlock display screen may be provided (at 704) on a graphical user interface of the electronic device, such as a display screen 300 of the type described above with reference to FIG. 3.

In some embodiments, a selection of the selectable option provided at 704 may be received at 706. That is, an input interface 206 associated with the electronic device 201 may be used to engage the selectable option.

In response to receiving a selection of the selectable option, the object access application 221 may configure (at 708) the associated object to be included on the unlock display screen 150. That is, the unlock display screen 150 may be configured to include a reference to the object associated with the selectable option when it is next displayed (e.g. at 510 of FIG. 5).

The method 506 may include other features or components apart from those illustrated in FIG. 5. For example, in some embodiments, the object access application 221 may be configured to control the number of references to objects that are displayed on the unlock display screen. More particularly, in order to avoid generating an unlock display screen that is overly cluttered with references to objects, the object access application 221 may consider the number of active references associated with an unlock display screen.

For example, in at least some embodiments, when an instruction to reference an object on the display screen is received (e.g. at 706 when a selection of the selectable object is received), the electronic device 201 may determine whether the total number of active unlock display screen objects exceeds a predetermined threshold. In at least some embodiments, the active unlock display screen objects may include any references to objects previously configured to be included on the unlock display screen that remain active when the selection of the selectable object is received at 706.

In response to determining that the total number of active unlock display screen objects exceeds the predetermined threshold, the electronic device 201 may selectively replace a reference to an object that was previously configured to be included on the unlock display screen with the reference to the object associated with the received instruction. This replacement may be done in accordance with user input, which may be received via an input interface associated with the electronic device 201. That is, the user may be provided with an option to select a previously configured reference to an object which will be removed from the unlock display screen to make room for the new reference to another object.

In some embodiments, the predetermined threshold that is used to evaluate the number of active unlock display screen objects may be set to one. That is, the unlock display screen may only include one reference to an object at a time.

In other embodiments, the electronic device may not evaluate the number of active unlock display screen objects. For example, the unlock display screen may be configured to only include one reference to an object at a time and the electronic device may simply replace a reference to an object that was previously configured to be included on the unlock display screen with the reference to the object associated with the instruction received at 706.

Removing Reference to Object

In some example embodiments, the electronic device 201 may be configured to allow a reference to an object to be removed from an unlock display screen so that it is not included when the unlock display screen is later displayed. An example of one such method 700 will be described with reference to FIG. 7.

At 802, an instruction to reference an object on the unlock display screen is received. The instruction may, for example, be received in the manner described above with reference to 706 of FIG. 6. More particularly, the instruction may be received when a selectable option to reference an object on an unlock display screen is selected.

Then, at 804, the electronic unlock display screen 150 is displayed in the manner described above with reference to 510 of FIG. 5.

Figure 8:
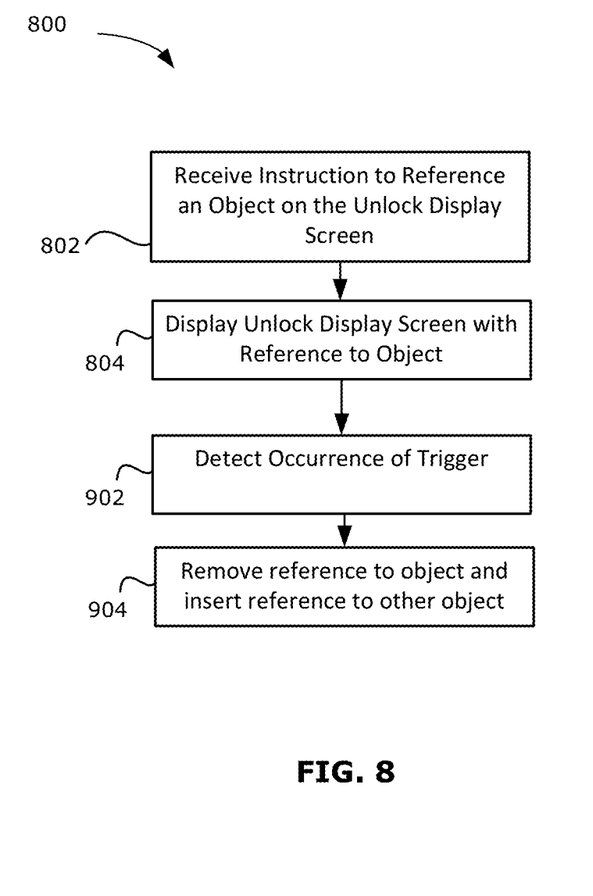
FIG. 8 is a flowchart of an example method for changing a reference to an object that is displayed on an unlock display screen.

In the embodiment of FIG. 8, the unlock display screen 150 may permit a reference to an object to be removed from the unlock display screen 150. For example, the unlock display screen 150 may include an interface element, such as an icon, which allows an instruction to remove the reference to the object from the unlock display screen. By way of example, in some embodiments, a user may press and hold the reference to the object to remove it.

In response to receiving the instruction to remove the reference to the object from the unlock display screen, at 808 the electronic device 201 removes the reference to the object from the unlock display screen and configures the object such that the reference to that object is not displayed on subsequent unlock display screens.

Toggle Between References to Different Objects

Referring now to FIG. 8, an example of a further method 800 is illustrated. The method 800 of FIG. 8 provides an unlock display screen 150 which may be configured with multiple references to objects, but may only display a subset of those references to objects at any given time. More particularly, the unlock display screen 150 may cycle between references to different objects.

The method 800 of FIG. 8 may be performed after an unlock display screen has already been configured to include at least one reference to an object. Thus, when an instruction is received (at 802, which may be performed in the manner described with reference to FIG. 7) to reference an object on the unlock display screen 150, the unlock display screen has already been configured to include a reference to at least one other object.

At 804, the unlock display screen is displayed in the manner described above with reference to FIG. 7. The unlock display screen 804 displayed at 804 does not immediately include all of the references to objects which were configured to be included on the unlock display screen 804; it only includes a portion of the references to objects which were previously configured to be included. For example, it may include only the reference to the object associated with the instruction received at 802.

Then, at 902, the electronic device 201 may detect the occurrence of a predetermined trigger. The predetermined trigger may, for example, be the expiration of a timer. That is, each reference to an object may be displayed for only a brief period of time. In other embodiments, other triggers (such as a shake of the electronic device 201) may be used.

Then, at 904, in response to detecting the occurrence of the predetermined trigger, the electronic device 201 may remove the displayed reference to the object from the unlock display screen and may replace it with a reference to another object which was previously configured to be referenced on the unlock display screen. That is, a reference to one object may be removed, and a reference to another object may be inserted in its place. Thus, the number of visible references to objects at any given time is restricted.

It will be appreciated that the methods and devices described herein may be used to configure unlock display screens of various types. For example, in some embodiments, the electronic device may be configured to operate using multiple locked modes. For example, in at least some embodiments, a first locked mode may be used to prevent accidental pocket dial errors. Similarly, in at least some embodiments, a second locked mode may be used to secure the electronic device (i.e. to prevent unauthorized access to the electronic device). In at least some embodiments, a separate unlock display screen may be associated with each of these locked modes. For example, a first unlock display screen may be displayed when the electronic device is in the first locked mode and a second unlock display screen may be displayed when the electronic device is in the second locked mode (which may be referred to as a Security lock mode). The first unlock display screen and the second unlock display screen may, in at least some embodiments, include different features.

In at least some embodiments, the locked modes may be associated with separate triggering events, which trigger the respective locked mode. For example, in at least some embodiments, the first lock mode may be entered when a lock button is pressed but when a timeout associated with authentication information (which may be referred to as a Security Lock timeout) has not yet expired. The second lock mode may, for example, be entered when the timeout associated with the authentication information has expired.

In at least some embodiments, the first lock mode may not require input of authentication information for the electronic device to be unlocked. The electronic device may, for example, be unlocked from the first lock mode when an action or gesture of a predetermined type is performed. In contrast, the second lock mode may require input of authentication information for the electronic device to be unlocked; for example, a password may be required.

Since the nature of the lock mode may differ, the nature of the unlock display screen may also differ. For example, some unlock display screens (e.g. the second unlock display screen associated with the second unlock mode described above) may include an interface element which allows for the input of authentication information (such as a password), while other unlock display screens (e.g. the first unlock display screen associated with the first unlock mode described above) may not include such an interface element. The methods and devices described herein may be used to include a reference to a data object on either of these types of unlock display screens or, in at least some embodiments on both a first unlock display screen associated with the first unlock mode described above and a second unlock display screen associated with the second unlock mode described above.

Furthermore, in at least some embodiments, the methods and devices described herein may be modified to allow a security policy configured by a system operator to be enforced. The security policy may establish whether an unlock display screen will be permitted to include a reference to a data object and/or whether data objects associated with a particular perimeter are prevented from being referenced on the unlock display screen. For example, in some embodiments, the security policy may permit data objects from both a first perimeter and a second perimeter to be reference on the unlock display screen. In some embodiments, the security policy may permit data objects associated with the first object to be referenced on the unlock display screen but may prevent data objects associated with the second object from being referenced on the unlock display screen. Accordingly, in at least some embodiments, the methods described herein may include steps of retrieving a security policy associated with the configuration of an unlock display screen and implementing the security policy.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable storage medium including program instructions recorded thereon, or a computer data signal carrying computer readable program instructions may direct an apparatus to facilitate the practice of the described methods. For example, a compute readable storage medium may include computer executable instructions for performing one or more of the methods described herein. It is understood that such apparatus and articles of manufacture also come within the scope of the present application.

The term "computer readable medium" or "computer readable storage medium" as used herein means any medium which can store instructions for use by or execution by a computer or other computing device including but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various example embodiments presented above are merely examples. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A processor-implemented method comprising:
providing a plurality of perimeters on an electronic device, the perimeters including a low-security perimeter and a high-security perimeter;
associating one or more objects, including a first object, with the low-security perimeter and one or more objects, including a second object, with the high-security perimeter;
based on the associations between the one or more objects and the one or more perimeters, selectively allowing one or more of the objects to be referenced on an unlock display screen, wherein selectively allowing comprises allowing the first object to be referenced on the unlock display screen and preventing the second object from being referenced on the unlock display screen, and wherein allowing the first object to be referenced on the unlock display screen includes allowing the first object to be viewable on the unlock display screen, and wherein preventing the second object from being referenced on the unlock display screen includes disallowing the second object from being viewable on the unlock display screen; and
providing the unlock display screen while the electronic device is locked, the unlock display screen providing an interface for receiving authentication information to unlock the electronic device, the locked electronic device disabling a plurality of electronic device features until the electronic device is unlocked,
wherein allowing the first object to be referenced comprises:
determining that the first object is associated with the low-security perimeter; and
in response to determining that the first object is associated with the low-security perimeter, providing a selectable option on a graphical user interface of the electronic device to reference the first object on the unlock display screen.

2. The method of claim 1 wherein preventing the second object from being referenced comprises:
determining that the second object is associated with the high-security perimeter; and
in response to determining that the second object is associated with the high-security perimeter, determining that a selectable option to reference the second object on the unlock display screen will not be provided on the graphical user interface of the electronic device.

3. The method of claim 1, further comprising:
receiving a selection of the selectable option to reference the first object on the unlock display screen and, in response, configuring the first object to be included on the unlock display screen; and
displaying the unlock display screen including the reference to the first object.

4. The method of claim 3, wherein the first object is an action item.

5. The method of claim 3, wherein the first object is a memo.

6. The method of claim 1, further comprising:
detecting a lock condition and, in response, locking the electronic device; and
displaying the unlock display screen.

7. The method of claim 1, wherein the low-security perimeter is a personal perimeter and the high-security perimeter is a corporate perimeter.

8. The method of claim 1, further comprising:
receiving an instruction to reference one of the objects on the unlock display screen;
in response to receiving the instruction to reference the object on the unlock display screen, determining whether a total number of active unlock display screen objects exceeds a predetermined threshold.

9. The method of claim 8, further comprising, in response to determining that the total number of active unlock display screen objects exceeds the predetermined threshold:
selectively replacing, in accordance with input received via an input interface associated with the electronic device, a reference to an object that was previously configured to be included on the unlock display screen with the reference to the object associated with the received instruction.

10. The method of claim 1, further comprising:
receiving an instruction to reference one of the objects on the unlock display screen; and
replacing a reference to an object that was previously configured to be included on the unlock display screen with the reference to the object associated with the received instruction.

11. The method of claim 1, further comprising:
receiving an instruction to reference one of the objects on the unlock display screen;
displaying the unlock display screen including the reference to the object associated with the received instruction;
detecting an occurrence of a predetermined trigger; and
in response to detecting the occurrence of the predetermined trigger, removing the reference to the object from the unlock display screen and inserting a reference to another object which was previously configured to be referenced on the unlock display screen.

12. The method of claim 1, further comprising:
receiving an instruction to reference one of the objects on the unlock display screen;
displaying the unlock display screen including the reference to the object; and
receiving an instruction, via the unlock display screen, to remove the reference to the object from the unlock display screen; and
in response to receiving the instruction to remove the reference to the object from the unlock display screen, removing the reference to the object from the unlock display screen and configuring the object such that the reference to that object is not displayed on subsequent unlock display screens.

13. An electronic device comprising:
a memory;
a display;
a processor coupled with the memory and the display, the processor configured to:
provide a plurality of perimeters on the electronic device, the perimeters including a low-security perimeter and a high-security perimeter;
associate one or more objects, including a first object, with the low-security perimeter and one or more objects, including a second object, with the high-security perimeter;
based on the associations between the one or more objects and the one or more perimeters, selectively allow one or more of the objects to be referenced on an unlock display screen, wherein selectively allowing comprises allowing the first object to be referenced on the unlock display screen and preventing the second object from being referenced on the unlock display screen, and wherein allowing the first object to be referenced on the unlock display screen includes allowing the first object to be viewable on the unlock display screen, and wherein preventing the second object from being referenced on the unlock display screen includes disallowing the second object from being viewable on the unlock display screen; and
provide the unlock display screen while the electronic device is locked, the unlock display screen providing an interface for receiving authentication information to unlock the electronic device, the locked electronic device disabling a plurality of electronic device features until the electronic device is unlocked,
wherein allowing the first object to be referenced comprises:
determining that the first object is associated with the low-security perimeter; and
in response to determining that the first object is associated with the low-security perimeter, providing a selectable option on a graphical user interface of the electronic device to reference the first object on the unlock display screen.

14. The electronic device of claim 13, wherein preventing the second object from being referenced comprises:
determining that the second object is associated with the high-security perimeter; and
in response to determining that the second object is associated with the high-security perimeter, determining that a selectable option to reference the second object on the unlock display screen will not be provided on the graphical user interface of the electronic device.

15. The electronic device of claim 13, wherein the processor is further configured to:
receive a selection of the selectable option to reference the first object on the unlock display screen and, in response, configuring the first object to be included on the unlock display screen; and
display the unlock display screen including the reference to the first object.

16. The electronic device of claim 15, wherein the first object is an action item.

17. A non-transitory computer readable storage medium comprising computer-executable instructions for:
providing a plurality of perimeters on an electronic device, the perimeters including a low-security perimeter and a high-security perimeter;
associating one or more objects, including a first object, with the low-security perimeter and one or more objects, including a second object, with the high-security perimeter;
based on the associations between the one or more objects and the one or more perimeters, selectively allowing one or more of the objects to be referenced on an unlock display screen, wherein selectively allowing comprises allowing the first object to be referenced on the unlock display screen and preventing the second object from being referenced on the unlock display screen, and wherein allowing the first object to be referenced on the unlock display screen includes allowing the first object to be viewable on the unlock display screen, and wherein preventing the second object from being referenced on the unlock display screen includes disallowing the second object from being viewable on the unlock display screen; and
providing the unlock display screen while the electronic device is locked, the unlock display screen providing an interface for receiving authentication information to unlock the electronic device, the locked electronic device disabling a plurality of electronic device features until the electronic device is unlocked,
wherein allowing the first object to be referenced comprises:
determining that the first object is associated with the low-security perimeter; and
in response to determining that the first object is associated with the low-security perimeter, providing a selectable option on a graphical user interface of the electronic device to reference the first object on the unlock display screen.

* * * * *